United States Patent

Tsuji et al.

[11] Patent Number: 6,005,835
[45] Date of Patent: Dec. 21, 1999

[54] COMPOSITE PRISM AND OPTICAL PICKUP USING THE SAME

[75] Inventors: Hiroyasu Tsuji, Sennai-gun; Toshio Fukazawa, Kyoto; Shogo Nasu, Kobe; Norimoto Nochi, Katano; Shinji Uchida; Tsuguhiro Korenaga, both of Neyagawa, all of Japan

[73] Assignee: Matsushita Electric Industrial Co., Ltd., Japan

[21] Appl. No.: 08/968,587

[22] Filed: Nov. 13, 1997

[30] Foreign Application Priority Data

Nov. 13, 1996 [JP] Japan .................................. 8-301544

[51] Int. Cl.$^6$ ....................................................... G11B 7/00
[52] U.S. Cl. ............................ 369/112; 369/103; 369/109
[58] Field of Search ..................................... 369/100, 109, 369/110, 112, 44.23, 44.24, 103

[56] References Cited

FOREIGN PATENT DOCUMENTS

| 0 612 068 A2 | 8/1994 | European Pat. Off. . |
| 0 612 068 A3 | 8/1994 | European Pat. Off. . |
| 8-329544 | 12/1996 | Japan . |
| 9-44893 | 2/1997 | Japan . |

*Primary Examiner*—Paul W. Huber
*Attorney, Agent, or Firm*—Parkhurst & Wendel, L.L.P.

[57] ABSTRACT

A prism and an optical pickup employing such prism includes a parallel prism having a polarization beam splitter film and a reflection film. The polarization beam splitter film is formed on an angled plane of a glass material having an approximate parallelogram cross-section, and consists of a multi-layer film of a composite film made of Si and $SiO_{2-x}$ (x<0.5) and multiple layers of multiple dielectric films. The reflection film is formed on an angled plane of the same glass material approximately parallel to the angled plane on which the polarization beam splitter film is formed, and consists of a multi-layer film of a composite film made of metal Si and oxide $SiO_{2-x}$ (x<0.5) as a high refractive film and multiple layers of multiple dielectric films as a relatively low refractive film.

23 Claims, 15 Drawing Sheets

COMPOSITE PRISM AND OPTICAL PICKUP USING THE SAME

FIELD OF THE INVENTION

The present invention relates to the field of prisms, and optical pickups employing prisms for integrating diffused light.

BACKGROUND OF THE INVENTION

At present, magneto-optical disks, write-once optical disks, and compact disks (CDs) are already commercialized as optical disks for recording and reproducing information via irradiation of laser beams. There is, however, increasing interest in digital video disks (DVDs) as the next generation recording medium.

An optical pickup is a device for recording and reproducing information to and from optical disks. Increasing importance is now being placed on development of technology for miniaturization of optical pickups in response to the increasing trend towards integration.

One example of an optical pickup is Japanese Patent Application H7-136462 which discloses a small optical pickup for magneto-optical disks shown in FIGS. 11A and 11B. FIG. 11A is a simplified sectional view of an optical system of the above prior art. FIG. 11B is a top view of a light receiving element, light emitting element, and analyzer. In FIGS. 11A and 11B, a substrate 82 is provided inside an optical module 81. A laser diode 83 as the light emitting element and photo detectors 84, 85, and 86 as the light receiving element are disposed on the substrate 82. The laser diode 83 has a structure which allows, for example, a concave portion having a 45° angled plane (not illustrated) to be disposed on one part of the substrate 82, and a light emitting chip (not illustrated) to be disposed inside that concave portion for reflecting light radiated from the light emitting chip on the 45° angled plane, thus routing the beam upward. Each of the photo detectors 84 and 85 consists of six components: 84a to 84f and 85a to 85f, respectively. The photo analyzer 86 consists of two components: 86a and 86b which are inclined approximately 45° with respect to the array direction of the photo detectors 84 and 85.

The transparent substrate 87 is made of glass or resin, and has a hologram diffraction grating 88 on the side facing the laser diode 83. The hologram diffraction grating 88 has a lens effect, giving different focal lengths to ± primary diffraction light which have been diffracted between approximately 5° and 20°. The transparent substrate 87 is provided over the optical module 81 to seal the inside of the optical module 81. A polarizing prism 89 has a trapezoidal cross-section, formed by bonding a triangular prism having a right triangle cross-section and an approximate parallel prism having an approximate 45° cross section. A polarization beam splitter film consisting of multiple layers of a range of thin dielectric films as shown in Table 1 is applied to a bonded portion 89a of the crystal polarizer 89 in such a way, for example, that the transmittance of p-polarized light is approximately 70%, the reflectance of p-polarized light is approximately 30%, and the reflectance of s-polarized light is approximately 100% when p-polarized light is emitted from the laser diode 83.

TABLE 1

|  |  | Film thickness |
|---|---|---|
| Substrate | n = 1.635 | — |
| 1st layer | TiO$_2$ | 119 nm |
| 2nd layer | SiO$_2$ | 183 nm |
| 3rd layer | TiO$_2$ | 119 nm |
| 4th layer | SiO$_2$ | 183 nm |
| 5th layer | TiO$_2$ | 119 nm |
| 6th layer | SiO$_2$ | 183 nm |
| 7th layer | TiO$_2$ | 119 nm |
| 8th layer | SiO$_2$ | 183 nm |
| 9th layer | TiO$_2$ | 119 nm |
| Substrate | n = 1.635 | — |

The polarizing prism 89 is integrated onto the transparent substrate 87, and an angled plane 89b inclines toward the inside of the optical module 81. A reflection film consisting of multiple layers of a range of thin dielectric film as shown in Table 2 is applied to the surface of the angled plane 89b.

TABLE 2

|  |  | Film thickness |
|---|---|---|
| Substrate | n = 1.635 | — |
| 1st layer | TiO$_2$ | 119 nm |
| 2nd layer | SiO$_2$ | 183 nm |
| 3rd layer | TiO$_2$ | 119 nm |
| 4th layer | SiO$_2$ | 183 nm |
| 5th layer | TiO$_2$ | 119 nm |
| 6th layer | SiO$_2$ | 183 nm |
| 7th layer | TiO$_2$ | 119 nm |
| 8th layer | SiO$_2$ | 183 nm |
| 9th layer | TiO$_2$ | 119 nm |
| 10th layer | SiO$_2$ | 183 nm |
| 11th layer | TiO$_2$ | 119 nm |
| 12th layer | SiO$_2$ | 183 nm |
| 13th layer | TiO$_2$ | 119 nm |
| 14th layer | SiO$_2$ | 183 nm |
| 15th layer | TiO$_2$ | 119 nm |
| 16th layer | SiO$_2$ | 183 nm |
| 17th layer | TiO$_2$ | 119 nm |
| 18th layer | SiO$_2$ | 183 nm |
| 19th layer | TiO$_2$ | 119 nm |
| 20th layer | SiO$_2$ | 183 nm |
| 21st layer | TiO$_2$ | 119 nm |
| 22nd layer | SiO$_2$ | 183 nm |
| 23rd layer | TiO$_2$ | 119 nm |
| 24th layer | SiO$_2$ | 183 nm |
| 25th layer | TiO$_2$ | 119 nm |
| 26th layer | SiO$_2$ | 183 nm |
| 27th layer | TiO$_2$ | 119 nm |
| 28th layer | SiO$_2$ | 183 nm |
| 29th layer | TiO$_2$ | 119 nm |
| 30th layer | SiO$_2$ | 183 nm |
| 31st layer | TiO$_2$ | 119 nm |
| 32nd layer | SiO$_2$ | 183 nm |
| 33rd layer | TiO$_2$ | 119 nm |
| Substrate | n = 1.635 | — |

A prism analyzer 90 has a trapezoidal cross-section, formed by bonding a prism having a triangular cross-section and a prism having a parallelogram cross-section. The prism analyzer 90 has a polarization splitting plane 90a at the junction plane of the above two prisms which is set to transmit approximately 100% of p-polarized light and reflect approximately 100% of s-polarized light. The prism analyzer 90 is disposed on the substrate 82 over the photo detector 86. The polarization splitting plane 90a is located over the component 86a of the photo detector 86, and an angled plane 90b is located over the component 86b of the photo detector 86. An object lens 91 is disposed over the polarizing prism 89 to focus the light.

In the magneto-optical pickup as configured above, p-polarized light emitted from the laser diode 83 is transmitted through the transparent substrate 87 on which the hologram diffraction grating 88 is formed, and enters the polarization splitting plane 89*a* of the polarizing prism 89. Since the polarization splitting plane 89*a* is set to transmit approximately 70% of p-polarized light, reflect approximately 30% of p-polarized light, and reflect approximately 100% of s-polarized light; approximately 70% of entering light is transmitted and focused by the object lens 91 on the magneto-optical recording medium 92. The polarization plane of light is rotated about 0.5° on the magneto-optical recording medium 92, depending on the type of recorded magnetic signals, for reflecting the light incorporating a small quantity of s-polarized light component as the magneto-optical signal component, following which the reflected light is transmitted through the object lens 91 again, and back to the polarization splitting plane 89*a* of the polarizing prism 89.

The polarization splitting plane 89*a* is set to transmit approximately 70% of p-polarized light, reflect approximately 30% of p-polarized light, and reflect approximately 100% of s-polarized light. Thus, approximately 70% of the p-polarized component is transmitted, and approximately 30% of the p-polarized component and 100% of the s-polarized component, which is the magneto-optical signal component, are reflected. Here, the components reflected on the polarization splitting plane 89*a* is reflected onto the angled plane 89*b*, passes through the transparent substrate 87 into the optical module 81, and enters the polarization splitting plane 90*a* of the prism analyzer 90. Since the polarization splitting plane 90*a* is set to transmit approximately 100% of p-polarized light and reflect approximately 100% of s-polarized light, the p-polarized light component passes through the polarization splitting plane 90*a* and enters the part 86*a* of the photo detector 86; the s-polarized component is reflected on the polarization splitting plane 90*a*, reflected on the angled plane 90*b*, and then enters the component 86*b* of the photo detector 86.

In the magneto-optical pickup as configured above, the polarizing prism 89 with different refractivity and transmittance for p-polarized light and s-polarized light is integrated into the optical module 81. The laser diode 83 and the photo detectors 84 to 86 are provided inside the optical module 81, and the prism analyzer 90 is integrated into the substrate 82. This configuration realizes a smaller, lower cost, and integrated optical pickup for magneto-optical disks.

Japanese Patent Application H7-188898 discloses a small optical pickup for DVDs as shown in FIGS. 12A and 12B. FIG. 12A shows a simplified sectional view of an optical system of the prior art, and FIG. 12B shows a magnified top view of a light receiving element.

In FIGS. 12A and 12B, an optical module 103 has a substrate 104 inside. A laser diode 105 and photo detectors 106, 107, and 108 are disposed on the substrate 104. The laser diode 105 is provided, for example, with a concave portion (not illustrated) having a 45° angled plane on a part of the substrate 104. A light emitting chip (not illustrated) is mounted inside, and light emitted from the light emitting chip is reflected on the 45° angled plane and radiated upwards. The laser diode emits linearly p-polarized light. The photo detectors 106 and 108 consist of four areas: 106*a*, 106*b*, 106*c*, and 106*d*; and 108*a*, 108*b*, 108*c*, and 108*d* respectively. The direction of the line that splits the areas 106*b* and 106*d*, and areas 108*b* and 108*d* is approximately parallel to the direction of the information tracks of a information recording medium 124. The transparent substrate 109 is made of glass or resin, and has a hologram diffraction grating 120 on the side facing the photo detectors 106, 107, and 108. A hologram diffraction grating 120 has a lens effect, giving ± primary diffraction light diffracted between approximately 5° and 20° to be focused close to and far from the transparent substrate 109 respectively, centering on the plane of the photo detectors 106, 107, and 108. The transparent substrate 109 is disposed to seal the inside of the optical module 103.

A polarization beam splitter 121 is formed by bonding a prism having an approximate right triangle cross-section and an approximate parallel prism having an approximate 45° cross-section. An optical film 121*a* which transmits p-polarized light and reflects s-polarized light is applied to the junction plane of the two prisms. The optical film 121*a* consists of multiple layers of multiple dielectric films as shown in Table 3.

TABLE 3

|  |  | Film thickness |
| --- | --- | --- |
| Substrate | n = 1.51 | — |
| 1st layer | TiO$_2$ | 97 nm |
| 2nd layer | SiO$_2$ | 152 nm |
| 3rd layer | TiO$_2$ | 97 nm |
| 4th layer | SiO$_2$ | 152 nm |
| 5th layer | TiO$_2$ | 97 nm |
| 6th layer | SiO$_2$ | 152 nm |
| 7th layer | TiO$_2$ | 97 nm |
| 8th layer | SiO$_2$ | 152 nm |
| 9th layer | TiO$_2$ | 97 nm |
| Substrate | n = 1.51 | — |

The polarization beam splitter 121 is disposed on and integrated into the transparent substrate 109. An angled plane 121*b* inclines towards the inside of the optical module 103. A quarter-wave plate 122 is disposed on the surface of the polarization beam splitter 121 in an integrated fashion, where it converts linearly polarized light to circularly polarized light.

In the optical pickup as configured above, p-polarized light emitted from the laser diode 105 passes through the transparent substrate 109, enters the polarization beam splitter 121, passes through the optical film 121*a*, and enters the quarter-wave plate 122. The p-polarized light is converted to the circularly polarized light in the quarter-wave plate 122, and the circularly polarized light is focused on the information recording medium 124 by an object lens 123. The circularly polarized light reflected upon receiving the information signal on the information recording medium 124 passes through the object lens 123 again, and enters the quarter-wave plate 122. Here, the circularly polarized light is again converted to linearly polarized light which orthogonally crosses the p-polarized light emitted from the laser diode 105, i.e. s-polarized light, in the quarter-wave plate 122. The s-polarized light then enters the polarization beam splitter 121, is reflected on the optical film 121*a* and on the angled plane 121*b*, and enters the hologram diffraction grating 120 of the transparent substrate 109.

Here, the light is diffracted at diffraction angles of approximately 5° to 20°. The + primary diffraction light, for example, enters the photo detector 106, zero diffraction light enters the photo detector 107, and the − primary diffraction light enters the photo detector 108.

In the configuration of the optical pickup for DVDs as explained above, the optical module 103 and polarization beam splitter 121 are integrated, and the polarization beam splitter 121 and quarter-wave plate 122 are also integrated, offering drastically smaller optical pickups. Furthermore, the number of components has been reduced by integrating the laser diode 105 and photo detectors 106, 107, and 108 into the optical module 103; and manufacturing costs have been reduced due to lack of need for extreme precision in the positioning of the photo detectors 106, 107, and 108.

Integration of components of optical pickups is achieved by employing a semiconductor laser which essentially generates diffused light, spreading to a certain range, as a light source. Therefore, the optical characteristics of components of optical pickups are strongly affected by the incident angle.

In the optical pickup for magneto-optical disks shown in FIGS. 11A and 11B, a phase difference may occur between the p-polarization light and s-polarization light responsive to broad incident angles because the polarization beam splitter film and reflection film disposed respectively on the face 89a of a glass material having an approximate parallelogram cross-section and the plane 89b which is approximately parallel to the plane 89a only consist of dielectric films.

FIG. 13 shows the phase difference between the p-polarized light and s-polarized light (hereafter referred to as the "p-s phase difference") of light reflected on the polarization beam splitter film, the p-s phase difference of light reflected on the reflection film, and the total of the p-s phase difference of the polarization beam splitter film and of the reflection film. This explains the dependence of the p-s phase difference on the incident angle when the light reflected on a disk enters a photo detector. As shown in FIG. 13, the p-s phase difference of the polarization beam splitter film is −50° to +40° when the light incident angle is ±10° with respect to the prism, therefore 45°±6° with respect to the optical film. The p-s phase difference of the reflection film exceeds −50° to +50° and the p-s phase difference of the light entering the photo detector (shown as the total p-s phase difference in FIG. 13) also exceeds −50° to +50°.

To satisfactorily reproduce the information recorded on a magneto-optical disk, the p-s phase difference when the light enters the photo detector may require to be within −20° to +20. With the polarization beam splitter film and reflection film of the prior art, it may be difficult to design an optical pickup which achieves the above preferable range for diffused light.

In the optical pickup for DVDs as shown in FIGS. 12A and 12B, transmittance of the p-polarized light in the polarization beam splitter film greatly depends on the incident angle, as shown in FIG. 14, when the light enters at a wide incident angle (the incident angle to the optical film is 45°±7° when the incident angle to the prism is 1°±0°). This may cause unsatisfactory reproduction due to reduced light entering the light receiving area.

Furthermore, since the hologram diffraction grating 120 is disposed on the transparent substrate 109 which seals the inside of the optical module, it may be necessary to broaden the diffraction angle θ of the diffracted light, i.e. to narrow the pitch of the diffraction grating, when the distance between the hologram diffraction grating 120 and photo detectors 106, 107, and 108 is short. This may cause difficulties in manufacturing such diffraction gratings, resulting in failure to achieve a satisfactory optical pickup.

SUMMARY OF THE INVENTION

The present invention offers a magneto-optical pickup which reduces the P-S phase difference.

The present invention further offers an optical pickup for DVDs which improves the light efficiency during reproduction and permits a wider diffraction grating.

A prism of the present invention and an optical pickup for magneto-optical disks employing the prism of the present invention comprises an approximate parallel prism having a polarization beam splitter disposed on an angled plane of a glass material having an approximate parallelogram cross-section and a reflection film on an angled plane which is approximately parallel to the angled plane on which the polarization beam splitter is disposed in the same glass material. The polarization beam splitter consists of a multi-layer film of a composite film made of a mixture of Si and $SiO_{2-x}$ (x<0.5) (hereafter "composite film") and multiple layers of multiple dielectric films. The reflection film consists of a multi-layer film of a composite film made of a mixture of metal Si and oxide $SiO_{2-x}$ (x<0.5) (hereafter "composite film") as high refractive film and multiple layers of multiple dielectric films as a relatively low refractive film.

In the approximate parallel prism of the magneto-optical pickup of the present invention, desirable refractive index n and absorption coefficient k of the composite film in the polarization beam splitter are $n \geq 2.8$ and $k \leq 0.3$.

In the approximate parallel prism of the optical pickup of the present invention, desirable diffraction index n and absorption coefficient k of the composite film in the reflection film are $n \geq 2.8$ and $k \leq 0.3$.

To achieve the aforementioned effect in an optical pickup for DVDs, the prism and optical pickup of the present invention comprises a parallel prism having a polarization beam splitter disposed on an angled plane of a glass material having an approximate parallelogram cross-section, a hologram diffraction grating disposed on an angled plane which is approximately parallel to an angled plane on which the polarization beam splitter is disposed, and a reflection film on the hologram diffraction grating. The polarization beam splitter consists of a multi-layer film of a composite film made of Si and $SiO_{2-x}$ (x<0.5) and multiple layers of multiple dielectric films. The reflection film consists of a single metal film or multi-layer film of a metal film and dielectric film.

In the approximate parallel prism of the optical pickup of present invention, desirable refractive index n and absorption coefficient k of the composite film in the polarization beam splitter are $n \geq 2.8$ and $k \leq 0.3$.

The reflection film is preferably made of an Ag film. It is more preferable to form a patterned reflection film by precision processing.

DESCRIPTION OF THE PREFERRED EMBODIMENTS

Figure 1:
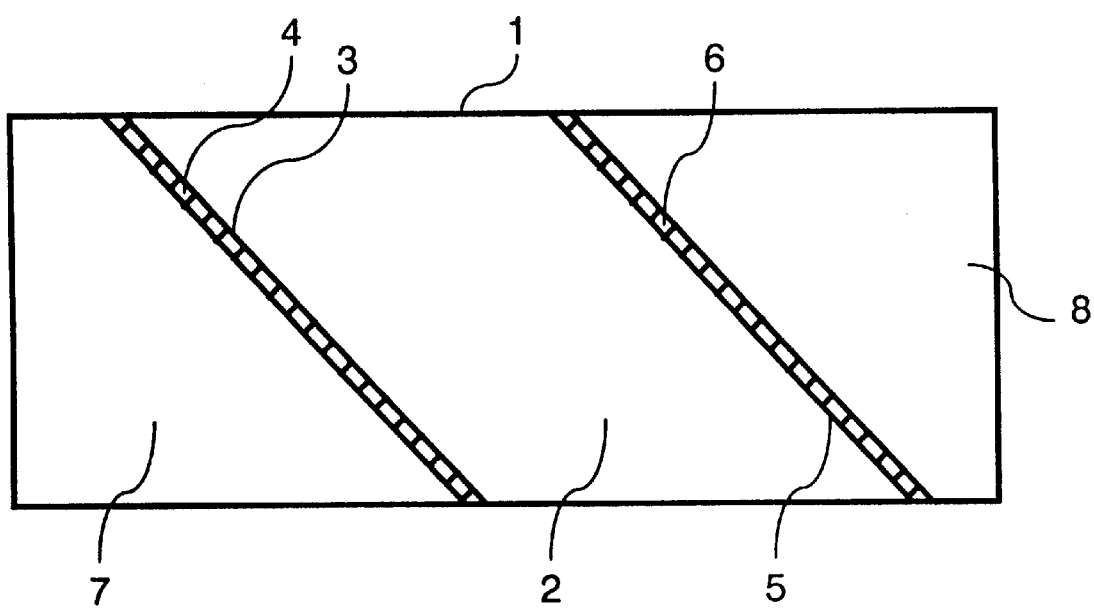
FIG. 1 is a sectional view of a prism in accordance with a first exemplary embodiment of the present invention.

The present invention employs a parallel prism comprising a polarization beam splitter film on an angled plane of a glass material having an approximate parallelogram cross-section and a reflection film disposed on an angled plane approximately parallel to the angled plane on which the polarization beam splitter film is disposed. The polarization beam splitter film consists of a multi-layer film of a composite film made of a mixture of Si and $SiO_{2-x}$ ($x<0.5$) and multiple layers of multiple dielectric films. The reflection film consists of a multi-layer film of a composite film made of a mixture of Si and $SiO_{2-x}$ ($x<0.5$) as a high refractive film and multiple layers of multiple dielectric films as a relatively low refractive film. Changes in optical characteristics can be prevented although the light incident angle changes, by employing a composite film of a mixture of Si and $SiO_{2-x}$ ($x<0.5$) in the polarization beam splitter film and reflection film. In other words, the composite film of the present invention has high refractive index n and low absorption coefficient k for reducing the dependence on the incident angle.

The refractive index n and absorption coefficient k of the composite film in the polarization beam splitter of the optical pickup of the present invention are $n \geq 2.8$ and $k \leq 0.3$. The refractive index n and absorption coefficient k of the composite film in the reflection film are also $n \geq 2.8$ and $k \leq 0.3$. The above values of the refractive index and absorption coefficients assure that the dependence on the incident angle is reduced and efficiency is improved.

The present invention according to one embodiment employs a parallel prism comprising a polarization beam splitter film disposed on an angled plane of a glass material having an approximate parallelogram cross-section, a hologram diffraction grating disposed on an angled plane in the same glass material approximately parallel to the angled plane on which the polarization beam splitter is disposed, and a reflection film disposed on the hologram diffraction grating. The polarization beam splitter film consists of a multi-layer film of a composite film made of a mixture of Si and $SiO_{2-x}$ ($x<0.5$) and multiple layers of multiple dielectric films. The reflection film consists of a single metal film or a multi-layer film of a metal film and dielectric film.

Changes in optical characteristics can be prevented, although the light incident angle changes, by employing the composite film made of a mixture of Si and $SiO_{2-x}$ ($x<0.5$) in the polarization beam splitter film. In other words, the composite film of the present invention has high refractive index n and low absorption coefficient for reducing the dependence on the incident angle. Since the hologram grating is disposed on the parallel prism, the optical distance between the hologram grating and the photo detector can be made longer, enabling the reduction of the diffraction angle θ of the hologram diffraction grating. This allows broader pitch of the hologram pattern for facilitating the creation of hologram grating in production.

The present invention according to another embodiment is an optical pickup in which the metal film in the polarization beam splitter has the refractive index n of $n \geq 2.8$ and the absorption coefficient k of $k \leq 0.3$. The dependence on the incident angle and efficiency can be improved by limiting the refractive index n and absorption coefficient k to the above ranges.

In one aspect of the present invention the metal film in the reflection film is made of Ag. The use of Ag for the metal film of the reflection film reduces the dependence of the reflectance on the incident angle and improves reflectance.

The present invention according to still another embodiment is an optical pickup comprising a patterned reflection film at least on the hologram diffraction grating by providing the reflection film only on the hologram diffraction grating. Peeling of the reflection film can be thus suppressed and satisfactory optical pickup can be realized although the reflection film and glass material show poor adhesivity.

The present invention according to another embodiment employs a parallel prism comprising a polarization beam splitter disposed on an angled plane of a parallelogram glass material having an approximate 45° cross-section and a hologram diffraction grating disposed on an angled plane approximately parallel to the angled plane on which the polarization beam splitter is disposed in the same glass material. The polarization beam splitter film consists of a multi-layer of a composite film made of a mixture of Si and $SiO_{2-x}$ ($x<0.5$) and multiple layers of multiple dielectric films. The refractive index n of the glass material is $n \geq 1.6$. A small optical pickup with higher efficiency and smaller dependence on the incident angle can be achieved without using a reflection film for adjusting the reflectance of the hologram diffraction grating.

According to one aspect of the above embodiment, the present invention is an optical pickup in which the refractive index n, absorption coefficient k, and total thickness d of the metal film in the polarization beam splitter is set to $n \geq 2.8$ and $k \leq 0.3$. The dependence on the incident angle and efficiency can be improved by limiting the refractive index n and absorption coefficient k to the above ranges.

The exemplary embodiments of the present invention are explained with reference to FIGS. 1 to 10 next.

First Exemplary Embodiment

Figure 2:
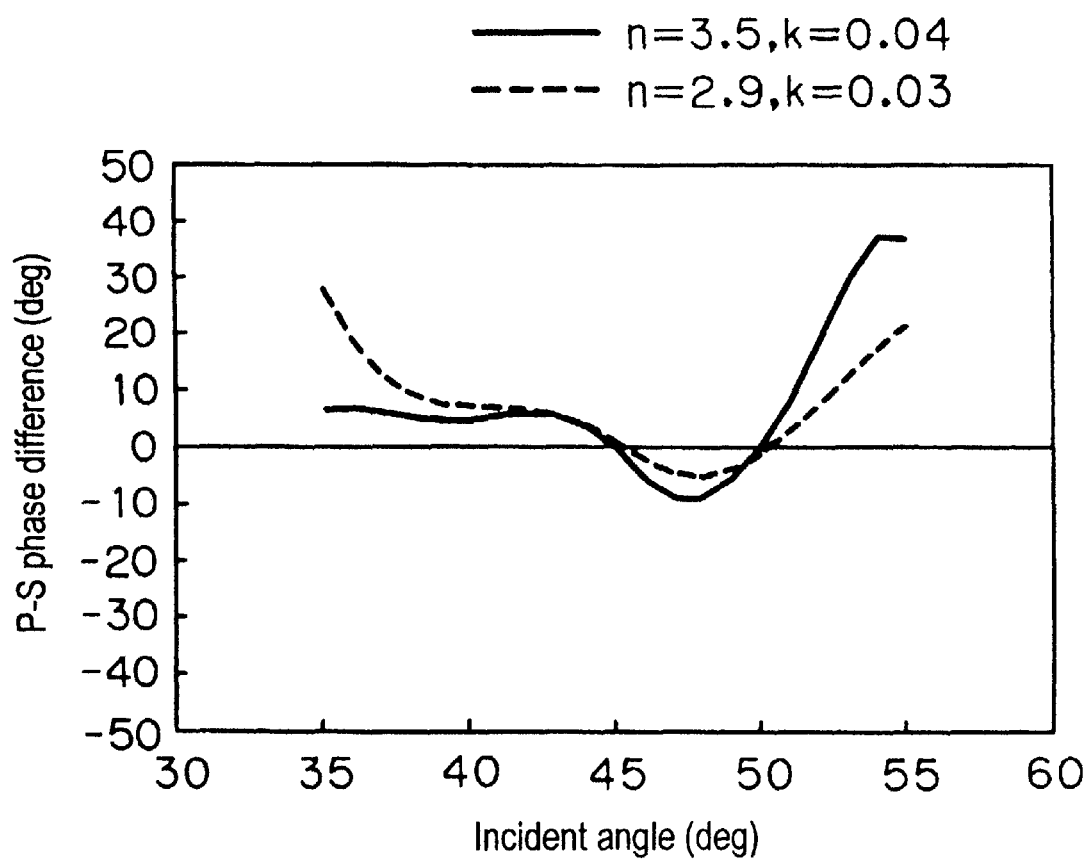
FIG. 2 shows the dependence on the incident angle of the p-s phase difference of a polarization beam splitter film in accordance with the first exemplary embodiment of the present invention.
Figure 3:
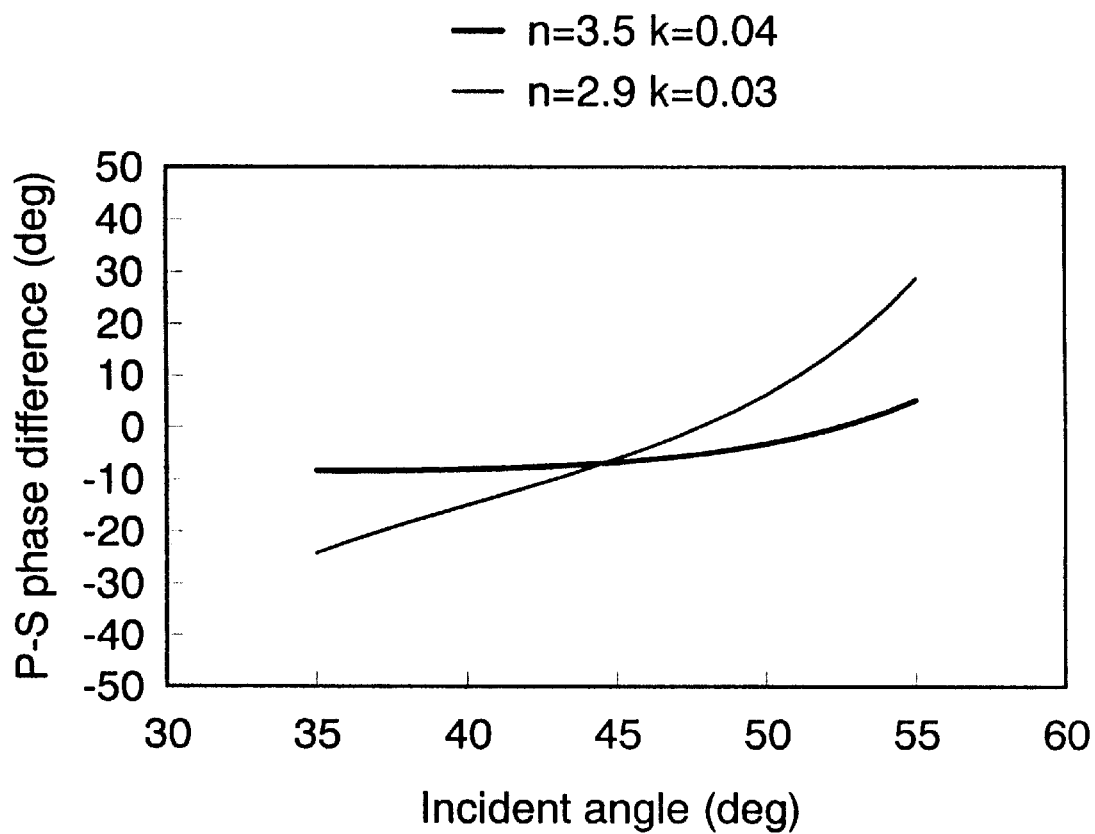
FIG. 3 shows the dependence on the incident angle of the p-s phase difference of a reflection film in accordance with the first exemplary embodiment of the present invention.
Figure 4:
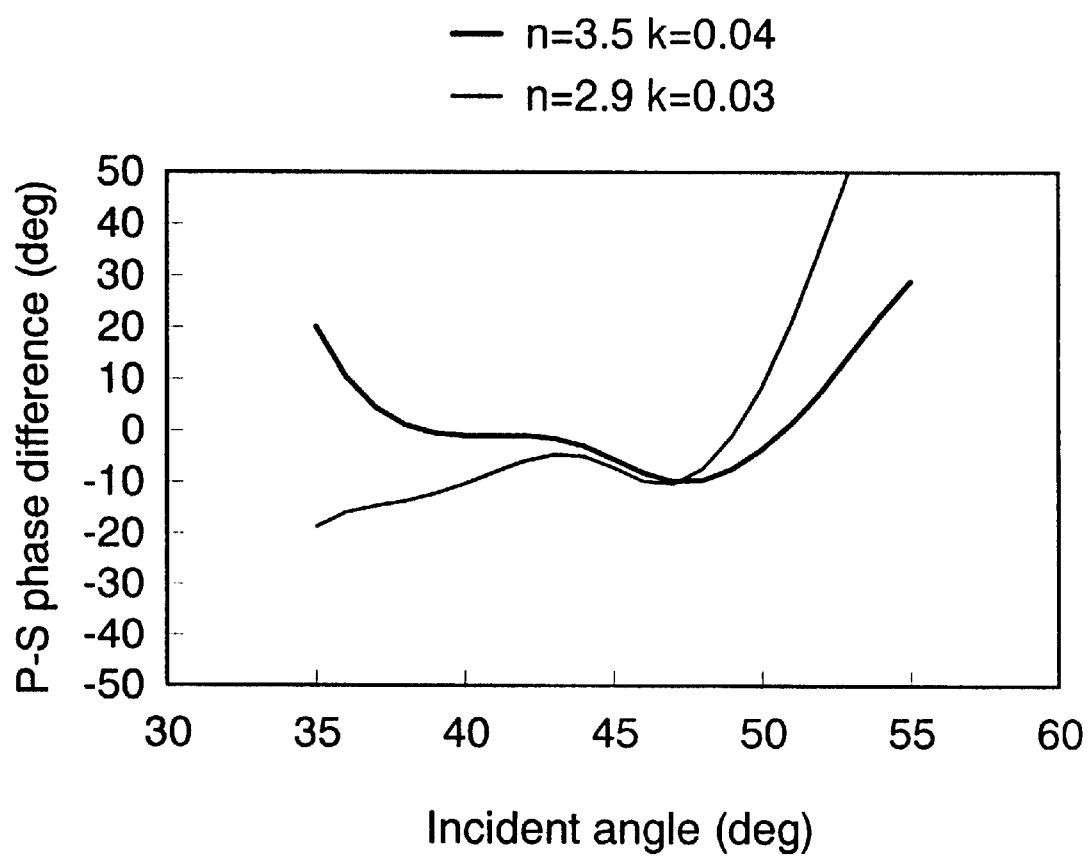
FIG. 4 shows the dependence on the incident angle of the p-s phase difference of the light passing through the polarization beam splitter film and the reflection film in accordance with the first exemplary embodiment of the present invention.

FIG. 1 shows a sectional view of a prism employed in an optical pickup for magneto-optical disks in a first exemplary embodiment of the present invention. FIGS. 2 to 4 show the dependence on the incident angle of the p-s phase difference of the prism.

As shown in FIG. 1, a prism 1 comprises a parallelogram-shaped glass material 2 having an approximate 45° cross-section. The refractive index n of the glass material 2 is 1.635. A polarization beam splitter film 4 consisting of a composite film made of a mixture of Si and $SiO_{2-x}$ (x=0.2) (hereafter "composite film"), and multiple layers of multiple dielectric films such as $Al_2O_3$, $SiO_2$, $Y_2O_3$, and $TiO_2$ films, shown in Table 4 and Table 5, is disposed on an angled plane 3 of the glass material 2.

TABLE 4

|  |  | Film thickness |
|---|---|---|
| Substrate | n = 1.635 | — |
| 1st layer | $Al_2O_3$ | 390 nm |
| 2nd layer | $Si + SiO_{2-x}$ | 25 nm |
| 3rd layer | $Al_2O_3$ | 324 nm |
| 4th layer | $Si + SiO_{2-x}$ | 25 nm |
| 5th layer | $Al_2O_3$ | 390 nm |
| 6th layer | $SiO_2$ | 186 nm |
| 7th layer | $Y_2O_3$ | 166 nm |
| 8th layer | $SiO_2$ | 186 nm |
| 9th layer | $Y_2O_3$ | 101 nm |
| 10th layer | $SiO_2$ | 186 nm |
| Substrate | n = 1.635 | — |

$Si + SiO_{2-x}$: n = 3.5, k = 0.04 (x = 0.2)

TABLE 5

|  |  | Film thickness |
|---|---|---|
| Substrate | n = 1.635 | — |
| 1st layer | $Al_2O_3$ | 262 nm |
| 2nd layer | $Si + SiO_{2-x}$ | 40 nm |
| 3rd layer | $Al_2O_3$ | 262 nm |
| 4th layer | $Si + SiO_{2-x}$ | 40 nm |
| 5th layer | $Al_2O_3$ | 388 nm |
| 6th layer | $SiO_2$ | 190 nm |
| 7th layer | $Al_2O_3$ | 196 nm |
| 8th layer | $SiO_2$ | 190 nm |
| 9th layer | $Al_2O_3$ | 156 nm |
| 10th layer | $SiO_2$ | 190 nm |
| Substrate | n = 1.635 | — |

$Si + SiO_{2-x}$: n = 2.9, k = 0.03 (x = 0.2)

The polarization beam splitter film 4 shown in Tables 4 and 5 consists of a 10-layer film.

A reflection film 6, comprising a multi-layer film of a composite film made of Si and $SiO_{2-x}$ (x=0.2) (hereafter "composite film) as high refractive index film and multiple layers of multiple dielectric films, which have relatively low refractive index such as $Al_2O_3$ and $TiO_2$ films, is disposed on an angled plane 5 which is approximately parallel to the angled plane 3 in the same glass material 2.

TABLE 6

|  |  | Film thickness |
|---|---|---|
| Substrate | n = 1.635 | — |
| 1st layer | $Al_2O_3$ | 295 nm |
| 2nd layer | $Si + SiO_{2-x}$ | 60 nm |
| 3rd layer | $TiO_2$ | 106 nm |
| 4th layer | $Si + SiO_{2-x}$ | 60 nm |
| 5th layer | $TiO_2$ | 106 nm |
| 6th layer | $Si + SiO_{2-x}$ | 60 nm |
| 7th layer | $TiO_2$ | 106 nm |
| 8th layer | $Si + SiO_{2-x}$ | 60 nm |
| 9th layer | $TiO_2$ | 106 nm |
| 10th layer | $Si + SiO_{2-x}$ | 60 nm |
| 11th layer | $TiO_2$ | 106 nm |
| 12th layer | $Si + SiO_{2-x}$ | 60 nm |
| 13th layer | $TiO_2$ | 106 nm |
| 14th layer | $Si + SiO_{2-x}$ | 60 nm |
| 15th layer | $TiO_2$ | 106 nm |

TABLE 6-continued

|  |  | Film thickness |
|---|---|---|
| 16th layer | $Si + SiO_{2-x}$ | 60 nm |
| 17th layer | $TiO_2$ | 106 nm |
| 18th layer | $Si + SiO_{2-x}$ | 60 nm |
| 19th layer | $TiO_2$ | 106 nm |
| 20th layer | $Si + SiO_{2-x}$ | 60 nm |
| 21st layer | $TiO_2$ | 106 nm |
| 22nd layer | $Si + SiO_{2-x}$ | 60 nm |
| 23rd layer | $Al_2O_3$ | 295 nm |
| Substrate | n = 1.635 | — |

$Si + SiO_{2-x}$: n = 3.5, k = 0.04 (x = 0.2)

TABLE 7

|  |  | Film thickness |
|---|---|---|
| Substrate | n = 1.635 | — |
| 1st layer | $Al_2O_3$ | 354 nm |
| 2nd layer | $Si + SiO_{2-x}$ | 60 nm |
| 3rd layer | $TiO_2$ | 127 nm |
| 4th layer | $Si + SiO_{2-x}$ | 60 nm |
| 5th layer | $TiO_2$ | 127 nm |
| 6th layer | $Si + SiO_{2-x}$ | 60 nm |
| 7th layer | $TiO_2$ | 127 nm |
| 8th layer | $Si + SiO_{2-x}$ | 60 nm |
| 9th layer | $TiO_2$ | 127 nm |
| 10th layer | $Si + SiO_{2-x}$ | 60 nm |
| 11th layer | $TiO_2$ | 127 nm |
| 12th layer | $Si + SiO_{2-x}$ | 60 nm |
| 13th layer | $TiO_2$ | 127 nm |
| 14th layer | $Si + SiO_{2-x}$ | 60 nm |
| 15th layer | $TiO_2$ | 127 nm |
| 16th layer | $Si + SiO_{2-x}$ | 60 nm |
| 17th layer | $TiO_2$ | 127 nm |
| 18th layer | $Si + SiO_{2-x}$ | 60 nm |
| 19th layer | $TiO_2$ | 127 nm |
| 20th layer | $Si + SiO_{2-x}$ | 60 nm |
| 21st layer | $TiO_2$ | 127 nm |
| 22nd layer | $Si + SiO_{2-x}$ | 60 nm |
| 23rd layer | $Al_2O_3$ | 354 nm |
| Substrate | n = 1.635 | — |

$Si + SiO_{2-x}$: n = 2.9, k = 0.03 (x = 0.2)

The reflection film 6 shown in Tables 6 and 7 is a 23-layer film.

Triangular prisms 7 and 8 are disposed on both sides of the glass material 2, and they are respectively bonded through the polarization beam splitter film 4 and the reflection film 6.

FIG. 2 shows the dependence of the p-s phase difference of the reflection light on the incident angle at the polarization beam splitter film 4 comprising a multi-layer film, and FIG. 3 shows the dependence of the p-s phase difference of the reflection light on the incident angle at the reflection film only. FIG. 4 shows the total p-s phase difference of the reflection light at the polarization beam splitter film and reflection film, in other words, the dependence on the incident angle of the light reflected on the disk entering the photo detector. In FIG. 2, the light incident angle is plotted along the abscissa, and this is the angle created between a normal plane 3 of the polarization beam splitter film 4 and the entering light. In FIG. 3, the angle created between a normal plane 5 of the reflection film and the entering light is plotted along the abscissa.

Figure 13:
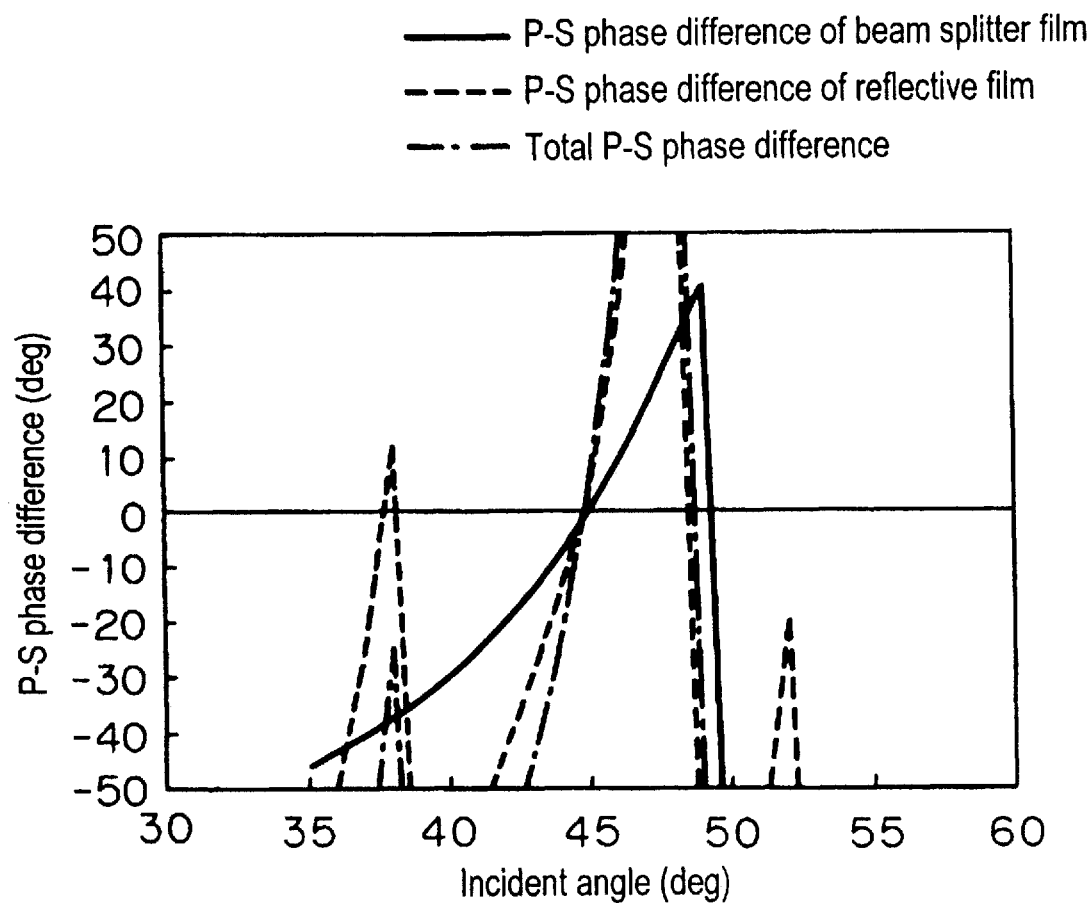
FIG. 13 shows the dependence on the incident angle of the p-s phase difference of a prism of the prior art.

It is apparent from FIGS. 2, 3, and 4 that the p-s phase difference at the polarization beam splitter film 4 is −10° to +10° (prior art: −50° to +40°) when the light incident angle against the prism is ±10, i.e. 45°±6° against an optical film, compared to the polarization beam splitter film and reflection film of the prior art comprising only multiple dielectric layers shown in FIG. 13. The p-s phase difference of the reflection film is −20° to +10° (prior art: −50° to +40°), and the p-s phase difference of the light entering the photo detector is −15° to +20° (prior art: −50° to +50°). The p-s phase difference may accordingly be reduced.

As for the composite film in the polarization beam splitter film and reflection film consisting of a mixture of Si and $SiO_{2-x}$, "x=0.2" is used as an example. The same characteristics can be achieved as long as x is 0<x<0.5.

Although it is not illustrated, it is apparent that the dependence of transmittance and reflectance on the incident angle is smaller because the refractive index n is large, and that high transmittance can be achieved because the absorption coefficient k is small.

Desirable phase characteristics can be thus achieved because a multi-layer film of a dielectric film and metal film basically complement mutual characteristics. Specifically, the dielectric film has no absorption loss in the film and its transmittance and reflectance can be freely adjusted by changing the composition of multiple materials, but its optical characteristics such as phase difference largely differ depending on the light incident angle. On the other hand, the optical characteristics of the metal film do not relatively change even the light incident angle changes because of its large refractive index, but it is difficult to achieve high transmittance with the metal film due to its large absorption coefficient. Accordingly, transmittance and reflectance can be freely adjusted, and dependence on light incident angle can be made smaller by alternately layering dielectric and metal films with complementary mutual characteristics. In the present invention, the composite film consisting of a mixture of Si and its $SiO_{2-x}$ is employed instead of a simple metal film. This realizes a high refractive index n and a low absorption coefficient k for enabling a highly efficient polarization beam splitter film and reflection film.

The refractive index and absorption coefficient k of the composite film in the polarization beam splitter film, consisting of a mixture of Si and its $SiO_{2-x}$ in the polarization beam splitter film, affect the dependence of the p-s phase difference of the reflected light on the incident angle as shown in FIGS. 2 to 4. As mentioned above, larger refractive index n and a smaller absorption coefficient k are preferred for the composite film, and to be more specific, $n \geq 2.8$ and $k \leq 0.3$ are desirable. This is because if n<2.8, the p-s phase difference of the light entering the photo detector may not fall within −20° to +20°, the essential prerequisite for desirable reproduction from recorded magneto-optical disks. If k>0.3, efficiency may fall.

In this exemplary embodiment, the angle of the glass material 2 is set to approximately 45°; however, the p-s phase difference characteristics of the reflected light related to the incident angle can be improved over those of a conventional multi-layer film as long as the angle of the glass material 2 is set within 35° to 55° and the above multi-layer film of the present invention is disposed on the angled plane 3 and the angled plane 5 which is approximately parallel to the angled plane 3.

Second Exemplary Embodiment

Figure 5:
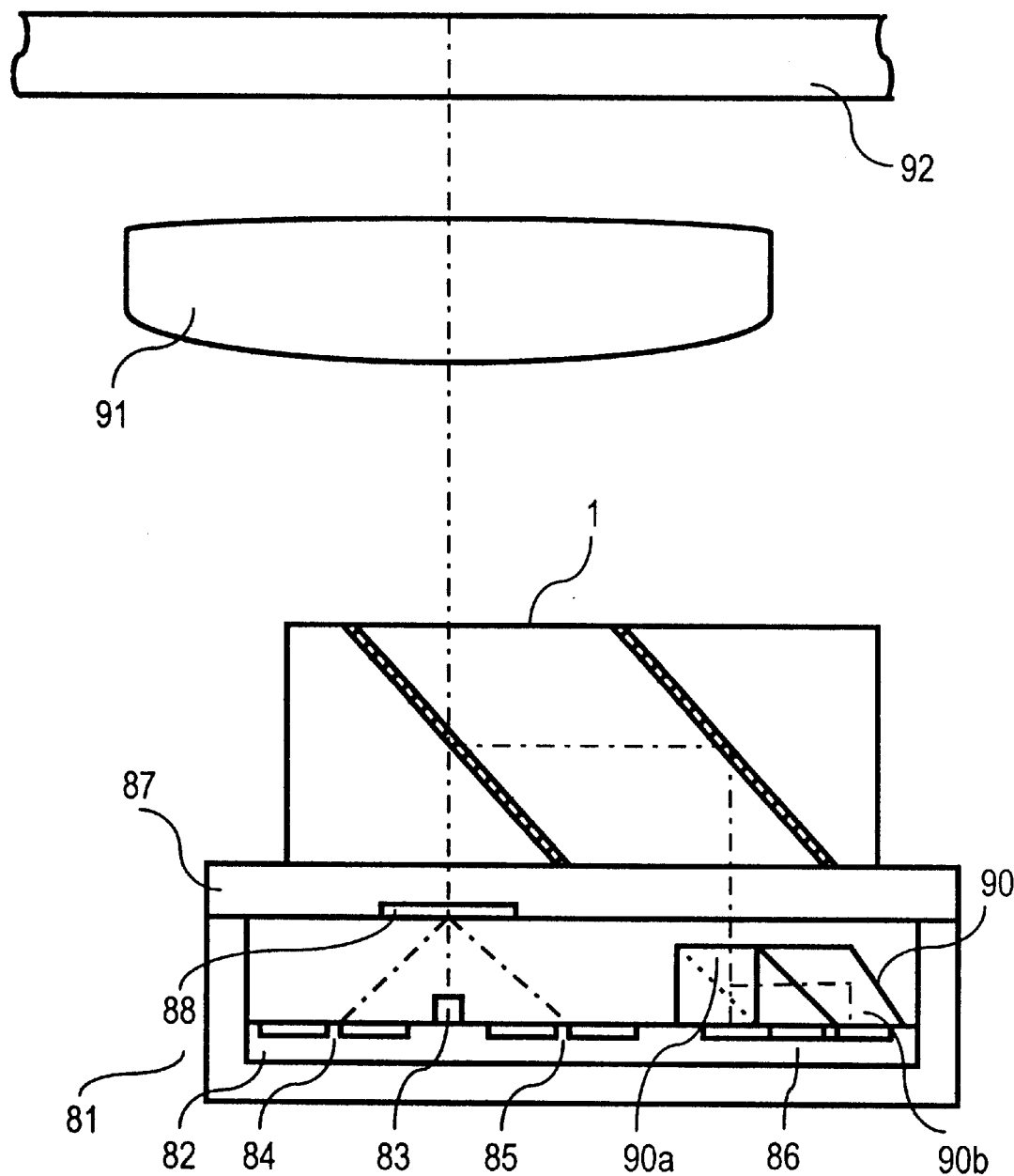
FIG. 5 is a sectional view of an optical pickup in accordance with a second exemplary embodiment of the present invention.

FIG. 5 shows a simplified sectional view of an optical pickup in a second exemplary embodiment of the present invention employing a prism in the first exemplary embodiment of the present invention. The prism in accordance with the first exemplary embodiment of the present invention is built into the optical pickup for magneto-optical disk shown in FIGS. 11A and 11B. This exemplary embodiment thus achieves improved reproduction from recorded magneto-optical disks by reducing the p-s phase difference.

Third Exemplary Embodiment

Figure 6:
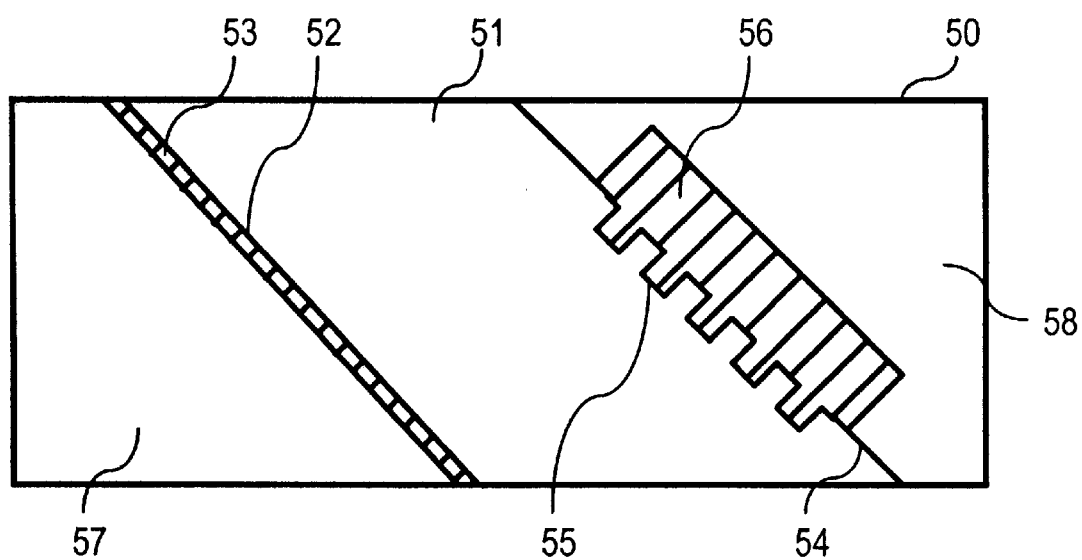
FIG. 6 is a sectional view of a prism in accordance with a third exemplary embodiment of the present invention.
Figure 7:
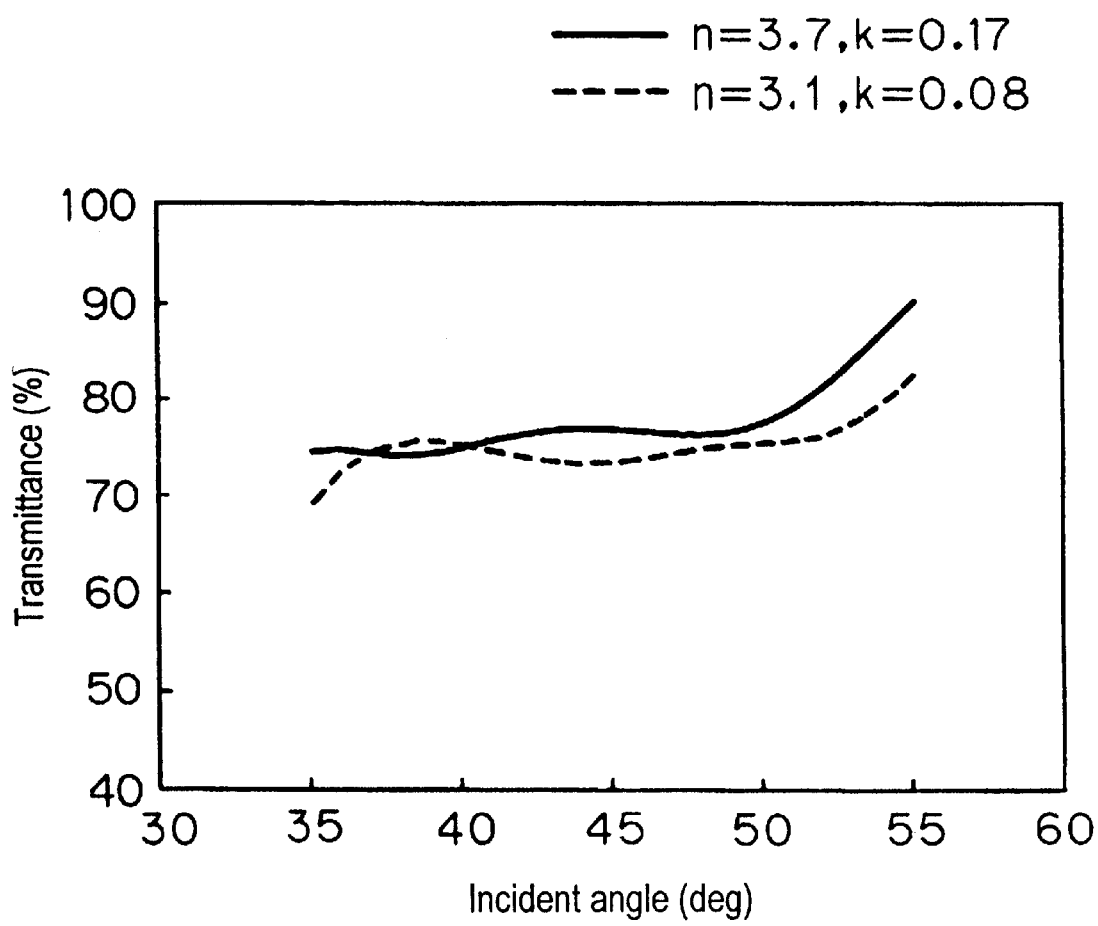
FIG. 7 shows the dependence on the incident angle of the transmittance of the prism in accordance with the third exemplary embodiment of the present invention.

FIG. 6 shows a prism which is employed in an optical pickup for DVDs in a third exemplary embodiment of the present invention. FIG. 7 shows basic performance of the prism in this exemplary embodiment, i.e. transmittance of a polarization beam splitter film against p-polarized light.

As shown in FIG. 6, a prism 50 comprises a parallelogram-shaped glass material 51 having an approximate 45° cross-section. The refractive index n of the glass material 51 is 1.51. A polarization beam splitter film 53 comprising a multi-layer of a composite film made of Si and $SiO_{2-x}$ (x=0.2) and multiple layers of multiple dielectric films such as $Al_2O_3$, $SiO_2$, $Y_2O_3$, and $TiO_2$ films, shown in Table 8 and Table 9, is disposed on an angled plane 52 of the glass material 51.

TABLE 8

|  |  | Film thickness |
|---|---|---|
| Substrate | n = 1.51 | — |
| 1st layer | $TiO_2$ | 42 nm |
| 2nd layer | $SiO_2$ | 75 nm |
| 3rd layer | $TiO_2$ | 89 nm |
| 4th layer | $SiO_2$ | 75 nm |
| 5th layer | $TiO_2$ | 89 nm |
| 6th layer | $SiO_2$ | 75 nm |
| 7th layer | $TiO_2$ | 89 nm |
| 8th layer | $SiO_2$ | 110 nm |
| 9th layer | $TiO_2$ | 89 nm |
| 10th layer | $SiO_2$ | 75 nm |
| 11th layer | $TiO_2$ | 89 nm |
| 12th layer | $SiO_2$ | 75 nm |
| 13th layer | $TiO_2$ | 89 nm |
| 14th layer | $SiO_2$ | 110 nm |
| 15th layer | $TiO_2$ | 114 nm |
| 16th layer | $SiO_2$ | 248 nm |
| 17th layer | Si + $SiO_{2-x}$ | 30 nm |
| 18th layer | $TiO_2$ | 42 nm |
| 19th layer | $SiO_2$ | 219 nm |
| 20th layer | $TiO_2$ | 89 nm |
| Substrate | n = 1.51 | — |

Si + $SiO_{2-x}$: n = 3.7, k = 0.17 (x = 0.2)

TABLE 9

|  |  | Film thickness |
|---|---|---|
| Substrate | n = 1.51 | — |
| 1st layer | $TiO_2$ | 31 nm |
| 2nd layer | $SiO_2$ | 85 nm |
| 3rd layer | $TiO_2$ | 83 nm |
| 4th layer | $SiO_2$ | 85 nm |
| 5th layer | $TiO_2$ | 83 nm |
| 6th layer | $SiO_2$ | 85 nm |
| 7th layer | $TiO_2$ | 83 nm |
| 8th layer | $SiO_2$ | 120 nm |
| 9th layer | $TiO_2$ | 83 nm |
| 10th layer | $SiO_2$ | 85 nm |
| 11th layer | $TiO_2$ | 83 nm |
| 12th layer | $SiO_2$ | 85 nm |
| 13th layer | $TiO_2$ | 83 nm |
| 14th layer | $SiO_2$ | 120 nm |
| 15th layer | $TiO_2$ | 107 nm |
| 16th layer | $SiO_2$ | 245 nm |
| 17th layer | Si + $SiO_{2-x}$ | 45 nm |
| 18th layer | $TiO_2$ | 31 nm |
| 19th layer | $SiO_2$ | 204 nm |
| 20th layer | $TiO_2$ | 83 nm |
| Substrate | n = 1.51 | − |

Si + $SiO_{2-x}$: n = 3.1, k = 0.08 (x = 0.2)

The polarization beam splitter film 53 shown in Tables 8 and 9 consists of a 20-layer film.

A hologram diffraction grating 55 is disposed on an angled plane 54 which is approximately parallel to the angled plane 52 in the same glass material 51. A reflection film 56 made of Ag is disposed on the hologram diffraction grating 55.

Triangular prisms 57 and 58 are disposed on both sides of the glass material 51, and they are respectively bonded through the polarization beam splitter film 53 and the reflection film 56.

Figure 14:
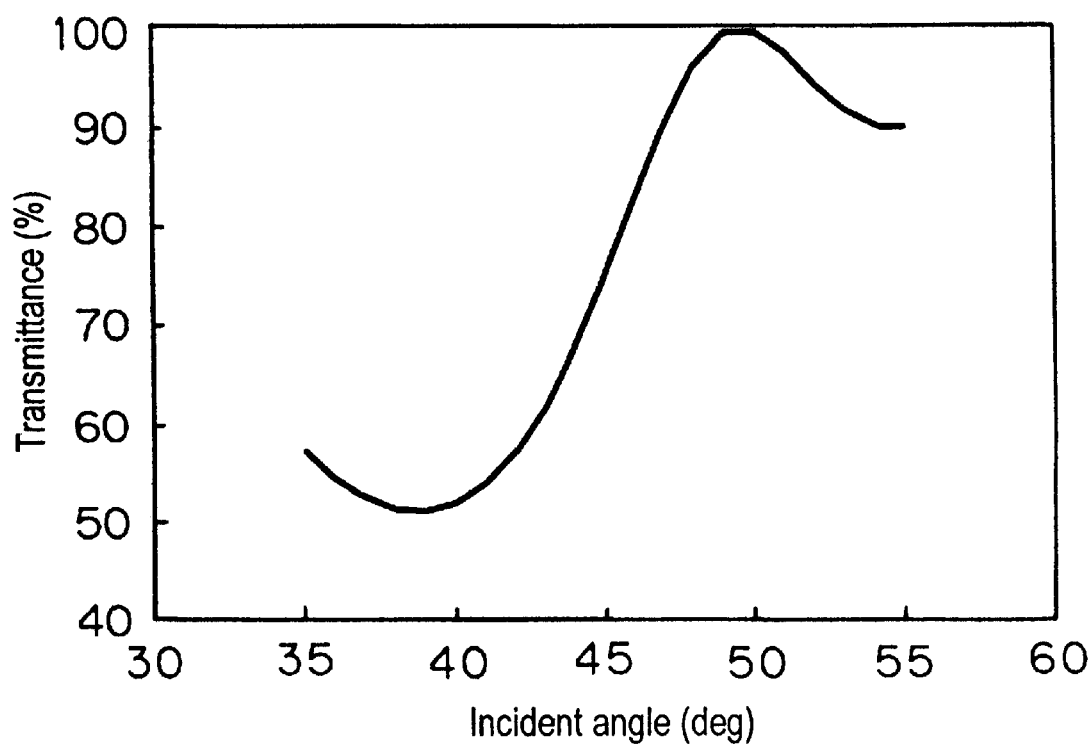
FIG. 14 shows the dependence on the incident angle of the transmittance of a polarization beam splitter film of the prior art.

FIG. 7 shows changes of the transmittance of the p-polarized light according to the light incident angle of the polarization beam splitter film 53 comprising a multi-layer film of the present invention. The transmittance of the polarization beam splitter film 53 is 79% to 90% (incident angle: 45°±7°). It is apparent that the transmittance is stabilized at small transition compared to that of the prior art, as shown in FIG. 14, which is 50% to 100%.

In FIG. 7, the light incident angle is plotted along the abscissa, and this is the angle created between the normal angled plane 52 of the polarization beam splitter film 53 and the entering light.

As for the composite film in the polarization beam splitter film and reflection film consisting of a mixture of Si and $SiO_{2-x}$, "x=0.2" is used as an example. The same characteristics can be achieved as long as x is 0<x<0.5.

Stabilized transmittance for the p-polarized light regardless of the incident angle can be achieved because a multi-layer film of a dielectric film and metal film basically complement mutual characteristics, as already explained in the first exemplary embodiment. In addition, high refractive index n and low absorption coefficient k can be achieved by employing a composite film consisting of a mixture of Si and its $SiO_{2-x}$ instead of a single metal film.

The refractive index and absorption coefficient k of the composite film in the polarization beam splitter film, consisting of a mixture of Si and $SiO_{2-x}$, affect the dependence of the p-s phase difference of the reflected light on the incident angle as shown in FIG. 7. A larger refractive index n and smaller absorption coefficient k for a composite film are preferred, and to be more specific, $n \geq 2.8$, $k \leq 0.3$ are desirable.

Figure 11A:
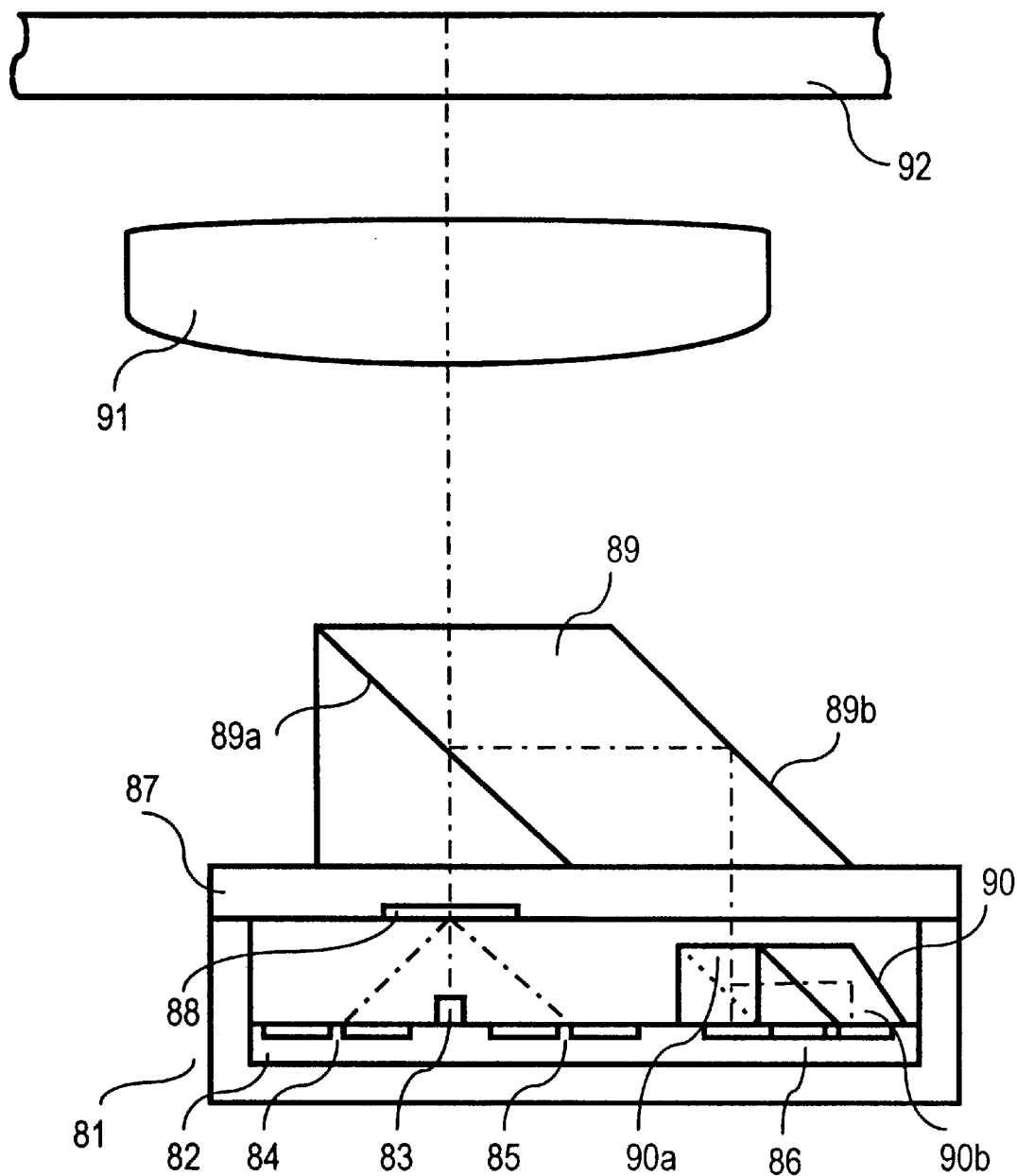
FIG. 11A is a simplified sectional view of an optical system of the prior art.
Figure 11B:
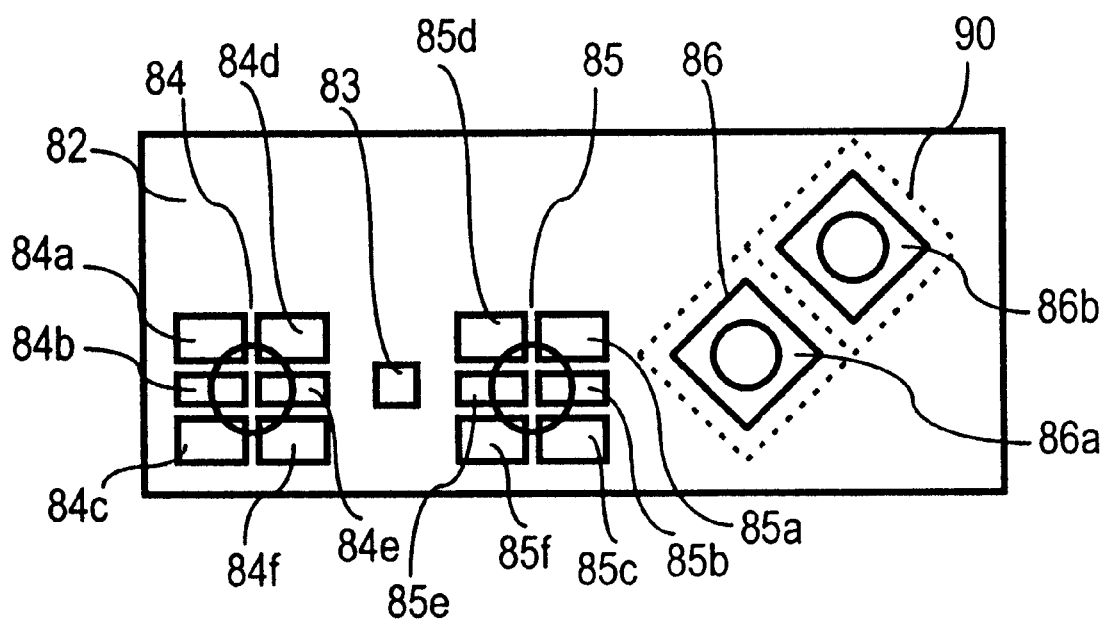
FIG. 11B is a top view of FIG. 11A illustrating a light receiving element, light emitting element, and photo detector of the prior art.

Since the hologram diffraction grating 55 is disposed on the angled plane 54 which is approximately parallel to the angled plane 52 of the glass material 51, the optical distance between the hologram optical element and the photo detector can be made longer than that in the prior art shown in FIGS. 11A and 11B, enabling the reduction of the diffraction angle θ of the hologram diffraction grating 55. This allows broader pitch of the hologram pattern for facilitating the creation of hologram grating in production.

Furthermore, the dependence of reflectance on the incident angle can be reduced and high reflectance can be achieved by using Ag for the metal film of the reflection film.

By providing a patterned reflection film at least on the hologram diffraction grating 55, peeling of the reflection film can be suppressed and desirable optical pickup can be achieved, in spite of poor adhesivity of the reflection film to the glass material.

This exemplary embodiment employs a parallelogram-shaped glass material 51 having an approximate 45° cross-section. However, the transmittance of p-polarized light depending on the incident angle can be stabilized, compared to the approximate parallel prism using a multi-layer film of the prior art, as long as the angle is between 35° to 55° by disposing the multi-layer film 53 on the angled plane 52, the hologram diffraction grating 55 on the angled plane 54 approximately parallel to the angled plane 52, and the reflection film 56 on the hologram diffraction grating 55.

Fourth Exemplary Embodiment

Figure 8:
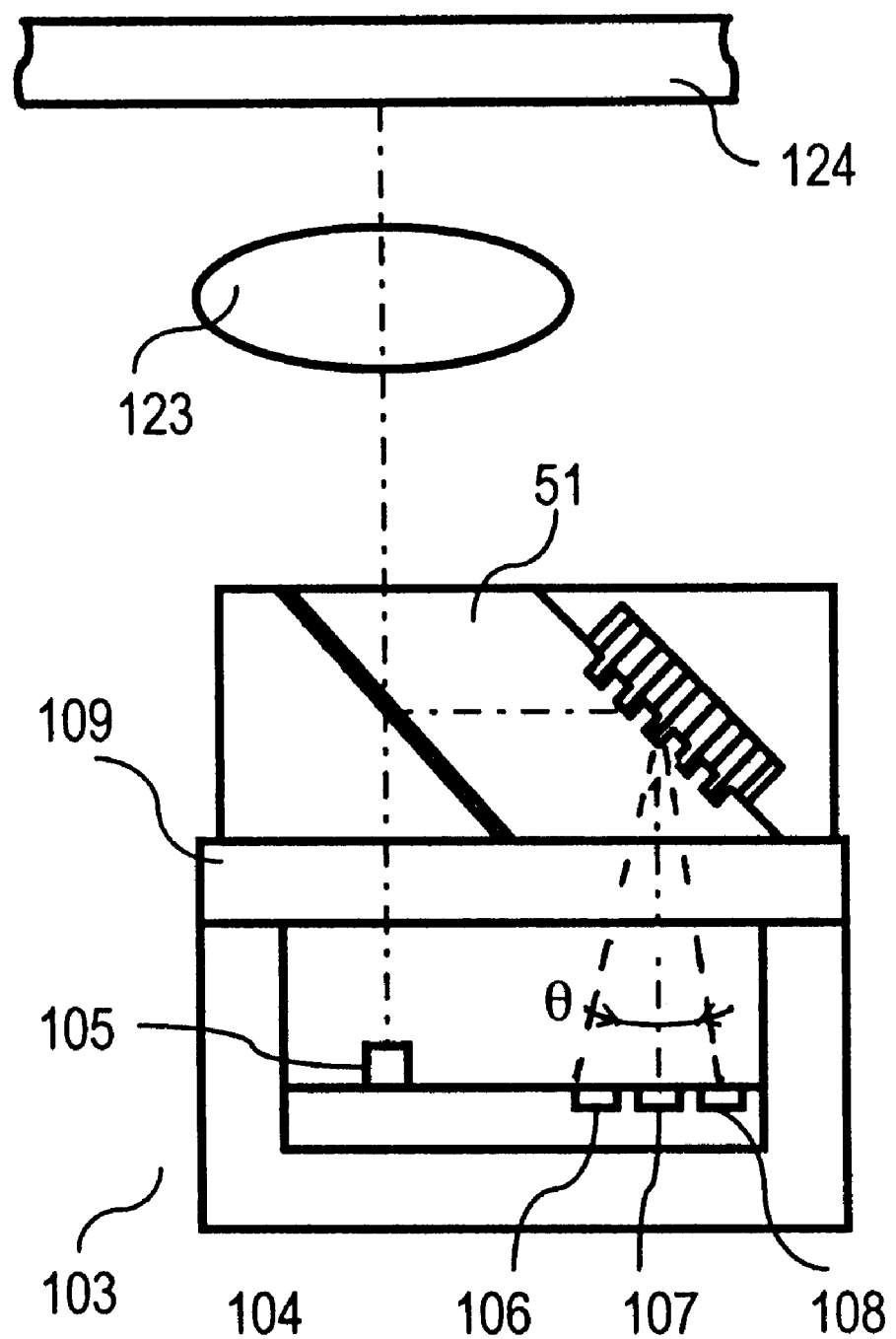
FIG. 8 is a sectional view of an optical pickup in accordance with a fourth exemplary embodiment of the present invention.

FIG. 8 shows a simplified sectional view of an optical system of an optical pickup in a fourth exemplary embodiment of the present invention employing a prism in accordance with the third exemplary embodiment of the present invention. In this exemplary embodiment, a prism in the third exemplary embodiment is mounted on the transparent substrate 109 without the hologram diffraction grating 120 of the optical pickup shown in FIGS. 12A and 12B. At measuring the characteristics for reproduction of DVDs employing the optical pickup of this exemplary embodiment, desirable reproduction has been achieved due to the increase in light efficiency by stabilizing the p-polarized light transmittance against the incident angle compared to the optical pickup of the prior art.

Fifth Exemplary Embodiment

Figure 9:
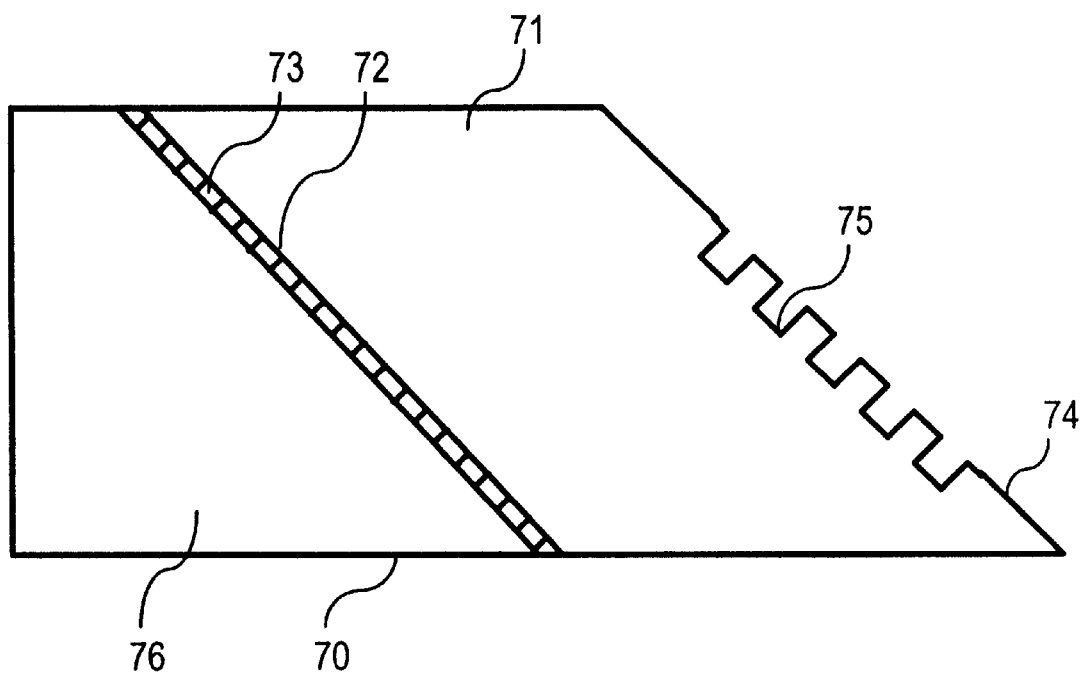
FIG. 9 is a sectional view of a prism of an optical pickup in accordance with a fifth exemplary embodiment of the present invention.

FIG. 9 shows a sectional view of a parallel prism, having an approximate 45° cross-section, employed in a pickup for DVDs in a fifth exemplary embodiment of the present invention.

As shown in FIG. 9, a prism 70 comprises a glass material 71 having an approximate parallelogram cross-section and a glass material 76 having an approximate triangular cross-section. The refractive index n of the glass material 71 having an approximate parallelogram cross-section is 1.6. A polarization beam splitter film 73 comprising a multi-layer film of a composite film made of Si and $SiO_{2-x}$ (x=0.2), and multiple layers of multiple dielectric films such as $Al_2O_3$, $SiO_2$, $Y_2O_3$, and $TiO_2$ films, shown in Table 8 and Table 9, is disposed on an angled plane 72 of the glass material 71. The polarization beam splitter film 73 shown in Tables 8 and 9 consists of a 20-layer film.

A hologram diffraction grating 75 is disposed on an angled plane 74 approximately parallel to the angled plane 72 in the same glass material 71.

Triangular prism 76 is disposed on the side of the polarization beam splitter film 73 on the glass material 71, and it is bonded through the polarization beam splitter film 73.

The effect of employing the multi-layer film for the polarization beam splitter film 73 in this exemplary embodiment is the same as that in the second exemplary embodiment, and thus the explanation for the effect is omitted here.

As for the composite film in the polarization beam splitter film and reflection film consisting of a mixture of Si and $SiO_{2-x}$, "x=0.2" is used as an example. The same characteristics can be achieved as long as x is 0<x<0.5.

The refractive index n and absorption coefficient k of the composite film in the polarization beam splitter film 73, consisting of a mixture of Si and its $SiO_{2-x}$, affect the dependence of the p-s phase difference of the reflected light on the incident angle as shown in FIG. 7. A larger refractive index n and smaller absorption coefficient k for a composite film is preferred, and to be more specific, $n \geq 2.8$, $k \leq 0.3$ are desirable, as explained in the third exemplary embodiment.

Figure 12A:
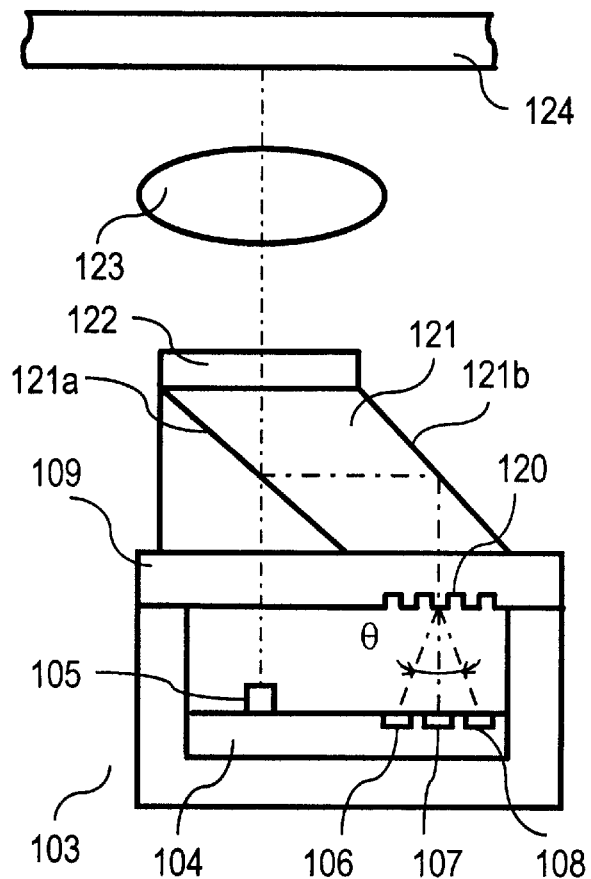
FIG. 12A is a simplified sectional view of an optical system of the prior art.
Figure 12B:
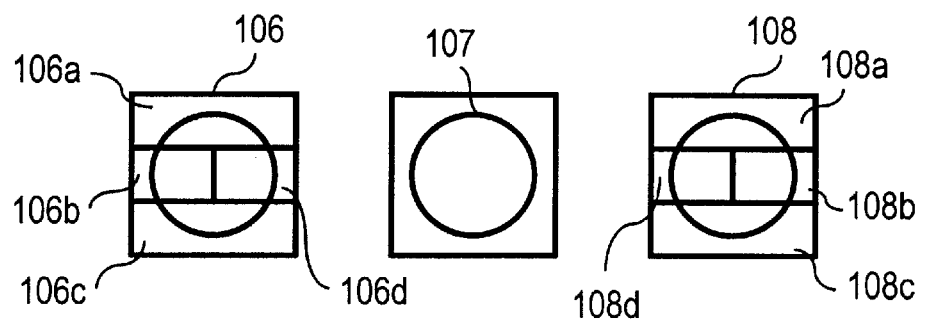
FIG. 12B is a top view of FIG. 12A illustrating a light receiving element, light emitting element, and photo detector of the prior art.

Since the hologram grating is disposed on the angled plane 74 which is approximately parallel to the angled plane 72 of the glass material 71, the optical distance between the hologram grating 55 and the photo detector can be made longer than that in the prior art shown in FIGS. 12A and 12B, enabling the reduction of the diffraction angle θ of the hologram grating. This allows broader pitch of the hologram pattern for facilitating the creation of hologram grating in production. This is also the same as the third exemplary embodiment.

The fifth exemplary embodiment may not require the reflection film 56 and triangular prism 58 which are employed in the third exemplary embodiment because the angle of the glass material 71 is approximately 45° and its refractive index is 1.6 in this exemplary embodiment for achieving desirable reflection characteristics for reflection on the glass material 71/air surface. Desirable reflection characteristics can be achieved when the refractive index n of the glass material 71 is n≧1.6.

Sixth Exemplary Embodiment

Figure 10:
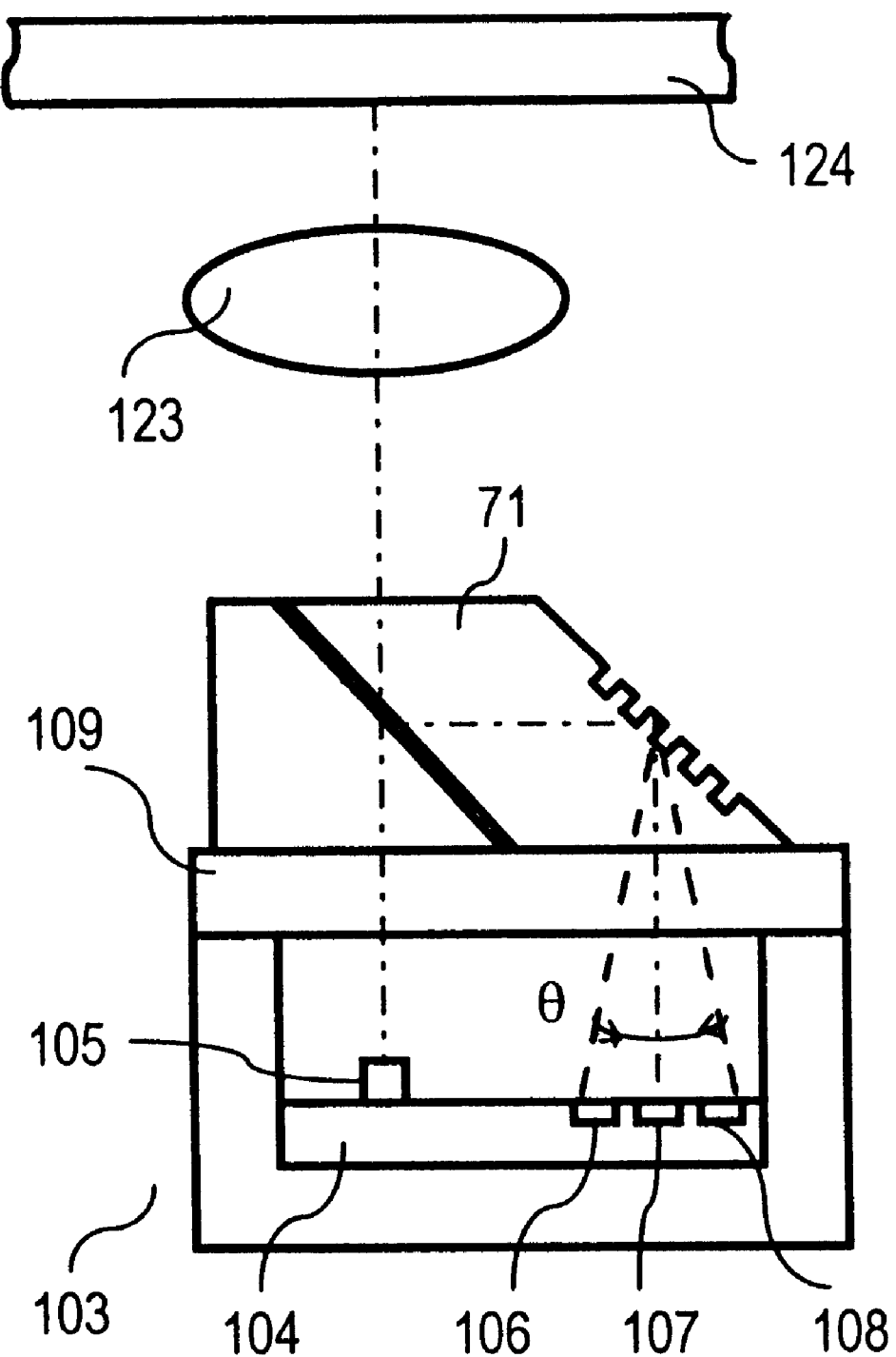
FIG. 10 is a sectional view of an optical pickup in accordance with a sixth exemplary embodiment of the present invention.

FIG. 10 shows a simplified sectional view of the optical system of the optical pickup in a sixth exemplary embodiment employing a prism of the fifth exemplary embodiment of the present invention. In this exemplary embodiment, the prism in the fifth exemplary embodiment is mounted on the transparent substrate 109 without the hologram grating 120 of the optical pickup shown in FIGS. 12A and 12B. At measuring the characteristics for reproduction of DVDs employing the optical pickup of this exemplary embodiment, desirable reproduction has been achieved due to the increase in light efficiency by stabilizing the p-polarized light transmittance against the incident angle, compared to the optical pickup of the prior art.

As described above, the prism and the optical pickup employing such prism of the present invention greatly reduces the p-s phase difference and achieves desirable reproduction without increasing the dependence of the reflectance and transmittance on the incident angle.

Since the hologram grating is disposed on the parallel prism in the prism of the present invention and the optical pickup employing such prism, the optical distance between the hologram optical element and the photo detector can be made longer than that in the prior art, enabling the reduction of the diffraction angle θ of the hologram diffraction grating. This allows broader pitch of the hologram pattern for facilitating the creation of hologram grating in production. Furthermore, the dependence of reflectance on the incident angle can be reduced and high reflectance can be achieved by using Ag for the metal film of the reflection film. By also providing a patterned reflection film at least on the hologram diffraction grating, peeling of the reflection film can be suppressed and desirable optical pickup can be achieved, in spite of poor adhesivity of the reflection film to the glass material.

Desirable reflection characteristics for reflection on the glass material 71/air surface can also be achieved by employing a parallel prism having an approximate 45° cross-section and setting the refractive index n to 1.6 or above.

What is claimed is:

1. A prism for optical pickups, comprising:
   a glass material having an approximate parallelogram cross-section and having a first angled plane and a second angled plane approximately parallel to each other;
   a multi-layer film disposed on said first angled plane of the glass material, said multi-layer film comprising a composite film comprising a mixture of Si and $SiO_{2-x}$, wherein x<0.5, and multiple layers of multiple dielectric films; and
   a multi-layer film disposed on said second angled plane of the glass material, said multi-layer film comprising a composite film comprising of a mixture of Si and $SiO_{2-x}$, wherein x<0.5, as a high refractive film and multiple layers of multiple dielectric films as a relatively low refractive film.

2. A prism for optical pickups as defined in claim 1, further comprising:
   a first triangular prism bonded to said multi-layer film formed on said first angled plane of the glass material; and
   a second triangular prism bonded to said multi-layer film formed on said second angled plane of the glass material.

3. A prism for optical pickups as defined in claim 1, wherein said dielectric films include at least one of $Al_2O_3$, $SiO_2$, $Y_2O_3$, and $TiO_2$.

4. A prism for optical pickups as defined in claim 1, wherein said composite film disposed on said first angled plane of the glass material has a refractive index n≧2.8 and an absorption coefficient k≦0.3, and said composite film disposed on said second angled plane of the glass material has a refractive index n≧2.8 and an absorption coefficient k≦0.3.

5. An optical pickup comprising the prism of claim 1, wherein said multi-layer film disposed on said first angled plane of the glass material is a polarization beam splitter and said multi-layer film disposed on said second angled plane of the glass material is a reflection film.

6. An optical pickup as defined in claim 5, wherein the refractive index n and absorption coefficient k of the composite film in a polarization beam splitter are n≧2.8 and k≦0.3, and the refractive index n and absorption coefficient k of the composite film reflection film are n≧2.8 and k≦0.3.

7. A prism for optical pickups, comprising:
   a glass material having an approximate parallelogram cross-section and having a first angled plane and a second angled plane approximately parallel to each other, and a hologram diffraction grating disposed on said second angled plane;
   a multi-layer film disposed on said first angled plane of the glass material, said multi-layer film comprising a composite film comprising a mixture of Si and $SiO_{2-x}$, wherein x<0.5 and multiple layers of multiple dielectric films; and
   a multi-layer film disposed on said hologram diffraction grating on said second angled plane of the glass material, said multi-layer film comprising at least metal.

8. A prism for optical pickups as defined in claim 7, further comprising:
   a first triangular prism bonded to said multi-layer film formed on said first angled plane of the glass material; and
   a second triangular prism bonded to said multi-layer film formed on said second angled plane of the glass material.

9. A prism for optical pickups as defined in claim 7, wherein said dielectric films include at least one of $Al_2O_3$, $SiO_2$, $Y_2O_3$, and $TiO_2$.

10. A prism for optical pickups as defined in claim 7, wherein the refractive index n and absorption coefficient k of the composite film disposed on said first angled plane of the glass material are n≧2.8 and k≦0.3; and the refractive index n and absorption coefficient k of the film formed on said second angled plane of the glass material are n≧2.8 and k≦0.3.

11. An optical pickup, comprising:
   a glass material having an approximate parallelogram cross-section and having a first angled plane and a second angled plane approximately parallel to each other, and a hologram diffraction grating disposed on said second angled plane;
   a multi-layer film disposed on said first angled plane of the glass material, said multi-layer film comprising a composite film comprising a mixture of Si and $SiO_{2-x}$, wherein x<0.5, and multiple layers of multiple dielectric films; and a multi-layer film disposed on said hologram diffraction grating on said second angled plane of the glass material, said multi-layer film comprising at least metal;

wherein said multi-layer film disposed on said first angled plane of the glass material is a polarization beam splitter and said multi-layer film disposed on said second angled plane of the glass material is a reflection film.

12. An optical pickup employing a parallel prism, comprising:

a multi-layer film disposed on an angled plane of a glass material having an approximate parallelogram cross-section, said multi-layer film being a polarization beam splitter and comprising a composite film comprising a mixture of Si and $SiO_{2-x}$, wherein $x<0.5$, and multiple layers of multiple dielectric films;

a hologram diffraction grating disposed on an angled plane of the same glass material approximately parallel to the angled plane on which said polarized beam splitter is disposed; and a multi-layer film disposed on said hologram diffraction grating, said multi-layer film comprising one of a single metal film and multi-layer metal and dielectric film.

13. An optical pickup as defined in claim 12, wherein the refractive index n and absorption coefficient k of the metal film in the polarization beam splitter are $n \geq 2.8$ and $k \leq 0.3$.

14. An optical pickup as defined in claim 12, wherein the single metal film is an Ag reflection film.

15. An optical pickup as defined in claim 14, wherein the reflection film is patterned and at least disposed on said hologram diffraction grating.

16. A prism for optical pickups, comprising:

a glass material having an approximate parallelogram cross-section and having a first angled plane and a second angled plane approximately parallel to each other, and a hologram diffraction grating disposed on said second angled plane;

a multi-layer film disposed on said first angled plane of the glass material, said multi-layer film comprising a composite film comprising a mixture of Si and $SiO_{2-x}$, wherein $x<0.5$, and multiple layers of multiple dielectric films; and an Ag film disposed on said hologram diffraction grating on said second angled plane of the glass material.

17. A prism for optical pickups as defined in claim 16, further comprising a first triangular prism bonded to said multi-layer film disposed on said first angled plane of the glass material.

18. A prism for optical pickups as defined in claim 16, wherein said dielectric films include at least one of $Al_2O_3$, $SiO_2$, $Y_2O_3$, and $TiO_2$.

19. A prism for optical pickups as defined in claim 16, wherein said composite film disposed on said first angled plane of the glass material has a refractive index $n \geq 2.8$ and an absorption coefficient $k \leq 0.3$.

20. An optical pickup, comprising:

a glass material having an approximate parallelogram cross-section and having a first angled plane and a second angled plane approximately parallel to each other, and a hologram diffraction grating disposed on said second angled plane;

a multi-layer film disposed on said first angled plane of the glass material, said multi-layer film comprising a composite film comprising a mixture of Si and $SiO_{2-x}$, wherein $x<0.5$, and multiple layers of multiple dielectric films; and an Ag film disposed on said hologram diffraction grating on said second angled plane of the glass material, wherein said multi-layer film disposed on said first angled plane of the glass material is a polarization beam splitter, and said Ag film disposed on said second angled plane of the glass material is a reflection film.

21. An optical pickup as defined in 20, wherein the refractive index n and absorption coefficient k of the metal film in the polarization beam splitter are $n \geq 2.8$ and $k \leq 0.3$.

22. An optical pickup employing a parallel prism, comprising:

a multi-layer film disposed on an angled plane of a parallelogram-shaped glass material having an approximate 45° cross-section, said multi-layer film being a polarization beam splitter and comprising a composite film comprising a mixture of Si and $SiO_{2-x}$, wherein $x<0.5$, and multiple layers of multiple dielectric films; and a hologram diffraction grating disposed on an angled plane of the same glass material approximately parallel to the angled plane on which said polarized beam splitter is disposed, wherein the refractive index of the glass material is $n \geq 1.6$.

23. An optical pickup as defined in claim 22, wherein the refractive index n and absorption coefficient k of a metal film in the polarization beam splitter are $n \geq 2.8$ and $k \leq 0.3$.

* * * * *